United States Patent
Hays et al.

(10) Patent No.: US 6,356,989 B1
(45) Date of Patent: *Mar. 12, 2002

(54) TRANSLATION LOOKASIDE BUFFER (TLB) ARRANGEMENT WHEREIN THE TLB CONTENTS RETAINED FOR A TASK AS SWAPPED OUT AND RELOADED WHEN A TASK IS RESCHEDULED

(75) Inventors: Kirk Hays, Hillsboro; Wayne D. Smith, Portland, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 07/993,783

(22) Filed: Dec. 21, 1992

(51) Int. Cl.$^7$ ................................................ G06F 12/10
(52) U.S. Cl. ....................................................... 711/205
(58) Field of Search ................................. 395/400, 425, 395/416, 417, 414, 415; 364/DIG. 1

(56) References Cited

U.S. PATENT DOCUMENTS

| | | | | |
|---|---|---|---|---|
| 4,068,303 A | * | 1/1978 | Morita | 395/400 |
| 4,638,426 A | * | 1/1987 | Chang et al. | 395/400 |
| 4,654,777 A | * | 3/1987 | Nakamura | 395/400 |
| 4,714,993 A | * | 12/1987 | Livingston et al. | 395/400 |
| 5,025,366 A | * | 6/1991 | Baror | 395/455 |
| 5,060,137 A | * | 10/1991 | Bryg et al. | 395/250 |
| 5,317,705 A | * | 5/1994 | Gannon et al. | 395/400 |
| 5,440,717 A | * | 8/1995 | Bosshart | 395/486 |

OTHER PUBLICATIONS

Smith, "Cache Memories", 1982, Computing Surveys, vol. 14, No. 3, pp. 473–530.*

Motorola, "MC88200 Cache/Memory Management Unit User's Manual", pp. 2–1 to 2–34, 1988.*

* cited by examiner

Primary Examiner—Kevin L. Ellis
(74) Attorney, Agent, or Firm—Blakely, Sokoloff, Taylor & Zafman LLP

(57) ABSTRACT

An improved method and apparatus for utilizing Translation Lookaside Buffers (TLB) for maintaining page tables in a paging unit on a computer system. TLB contents for executing tasks are retained when the task is swapped out. The contents are then reloaded into the TLB when the task is again scheduled for execution. Spare memory cycles are utilized to transfer outgoing TLB data into memory, and incoming TLB data for a next scheduled task from memory.

10 Claims, 7 Drawing Sheets

TRANSLATION LOOKASIDE BUFFER (TLB) ARRANGEMENT WHEREIN THE TLB CONTENTS RETAINED FOR A TASK AS SWAPPED OUT AND RELOADED WHEN A TASK IS RESCHEDULED

BACKGROUND OF THE INVENTION

1. Field of the Invention

The present invention relates generally to the field of computer systems and in particular, to translation lookaside buffers as used in memory paging subsystems.

2. Prior Art

Known prior art processors utilize a technique known as paging in order to manage memory resources. Paging is a memory management technique wherein a program is divided into uniform sized blocks called pages. Paging is used in support of various computer system features such as multi-tasking. An example of a processor utilizing paging is the Intel486™ family of processors, available from Intel Corporation of Santa Clara, Calif.

In a paging system data is moved to and from system memory by pages. A key aspect of paging is the translation of an address provided by a program, termed a linear address, to a physical address. The physical address is the real address of the page of data in storage. Various computer architectures utilize different address schemes. The address translation scheme as utilized by the Intel486 product is described with reference to FIG. 1. Referring to FIG. 1, a linear address is provided to a paging unit. Note that a linear address 101 is provided to the paging unit when servicing a page fault. A page fault occurs when a page accessed by an executing program, is not in memory. The linear address is first compared to entries in a Translation Lookaside Buffer (TLB) 102. The TLB 102 is a cache of the thirty-two most commonly referenced page table entries of a currently executing task The page table entries contain the physical address for the page in a storage medium. If the linear address is found, a TLB hit has occurred. Thus the desired physical address is found directly in the TLB. This is desirable since it avoids subsequent processing by the paging unit and results in an increase speed in the translation of a linear address to physical address.

If the linear address is not found in the TLB 102, then the linear address must be translated. The Intel486 utilizes a two level translation scheme. A first, portion of the linear address is utilized to index to an entry in Page Directory 104. The Page Directory 104 is a table of indices into Page Table 105. In the Intel486 the upper ten bits of the linear address are used as an index to the Page Directory 104.

A second portion of the linear address provides an offset to the Page Table index retrieved from the Page Directory 104 to create an index to one of the Page Table entries. Each Page Table entry in Page Table 105 contains the starting address of the page frame as well as statistical information about the page. This starting address is the desired physical address for the page.

Processing in this manner continues until a task switch occurs. A task switch may occur as a result of the expiration of allotted time for a task, or as a result of an interrupt. In any event, whenever a task switch occurs, the page directory and page table for the new task are loaded, and the TLB must be flushed. By flushed it is meant that the TLB's contents are cleared. The contents of the TLB are entered as page faults occur in the executing task As tasks are continually swapped in and out, the TLB is continually being flushed. This has the effect of wasting the effort of building entries in the TLB in a prior execution of the task Thus, it is desirable to improve utilization of a Translation Lookaside Buffer by eliminating the need to reload the TLB through page faults when a task switch occurs.

SUMMARY

A method and apparatus for utilizing a Translation lookaside Buffer (TLB) in a paging unit on a computer system, is disclosed. In the present invention the contents of a TLB are saved when a task switch occurs. The TLB contents are associated with the task being executed. When the task is again scheduled for execution, the old TLB contents are reloaded back into the TLB. Two storage areas are embodied in the TLB structure. One storage area is for storing page table entries for an incoming task and the second storage area is for storing page table entries for an outgoing task On a program task switch, the contents of the TLB are moved to the outgoing TLB storage area and the TLB is loaded with the contents of the incoming TLB storage area. As a current task is executing the next scheduled task is identified. When spare memory cycles are available, the TLB for the incoming task is moved from memory and into the incoming TLB storage area Similarly, the outgoing TLB storage area is moved to memory during spare memory cycles while the new current task is executed.

DETAILED DESCRIPTION OF THE PREFERRED EMBODIMENT

A translation lookaside buffer arrangement as used in paging units on a computer system, is described. In the following description, numerous specific details, eg. page directory and page table structures, are set forth in order to provide a thorough understanding of the present invention. It will be apparent, however, to one skilled in the art that the present invention may be practiced without such specific details. In other instances, specific implementation details, such as timing diagrams for memory cycle transfers, have not been shown in detail in order not to unnecessarily obscure the present invention.

Overview Of A Computer System In The Preferred Embodiment

Figure 1:
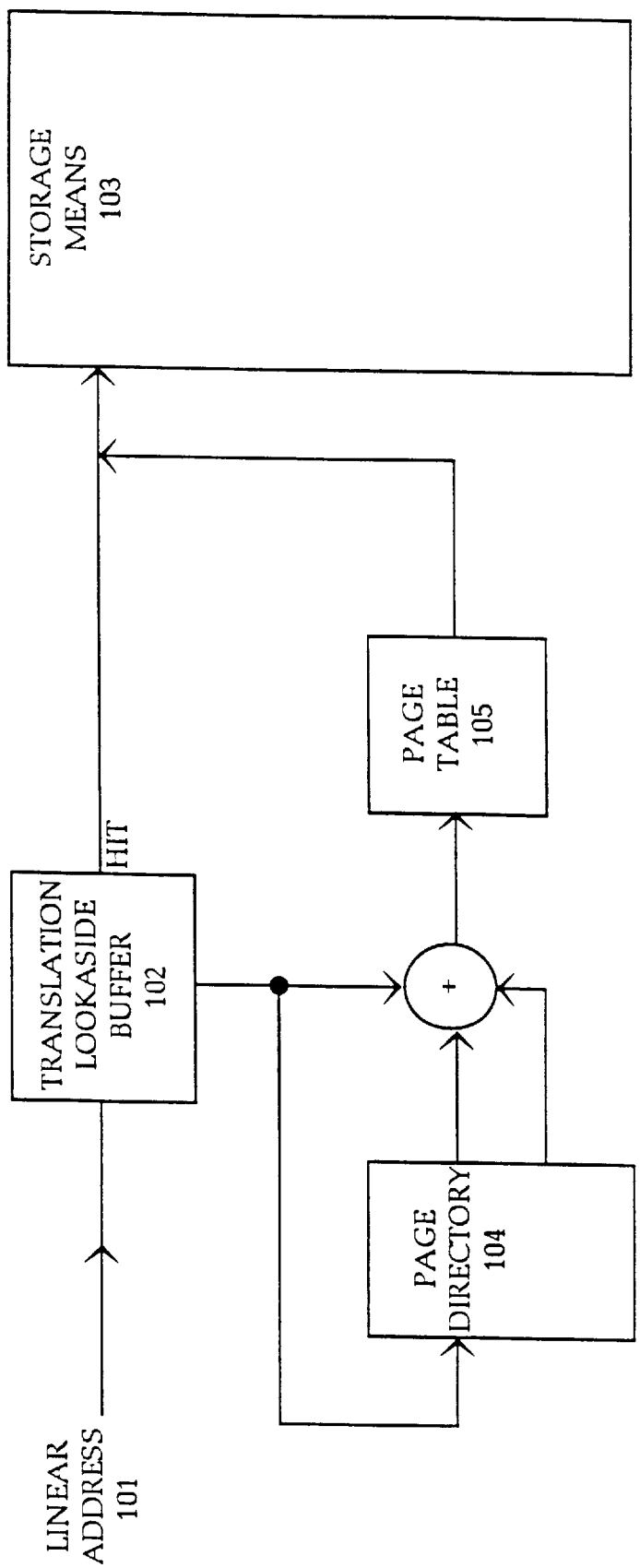
FIG. 1 is a block diagram of a prior art paging unit
Figure 2A:
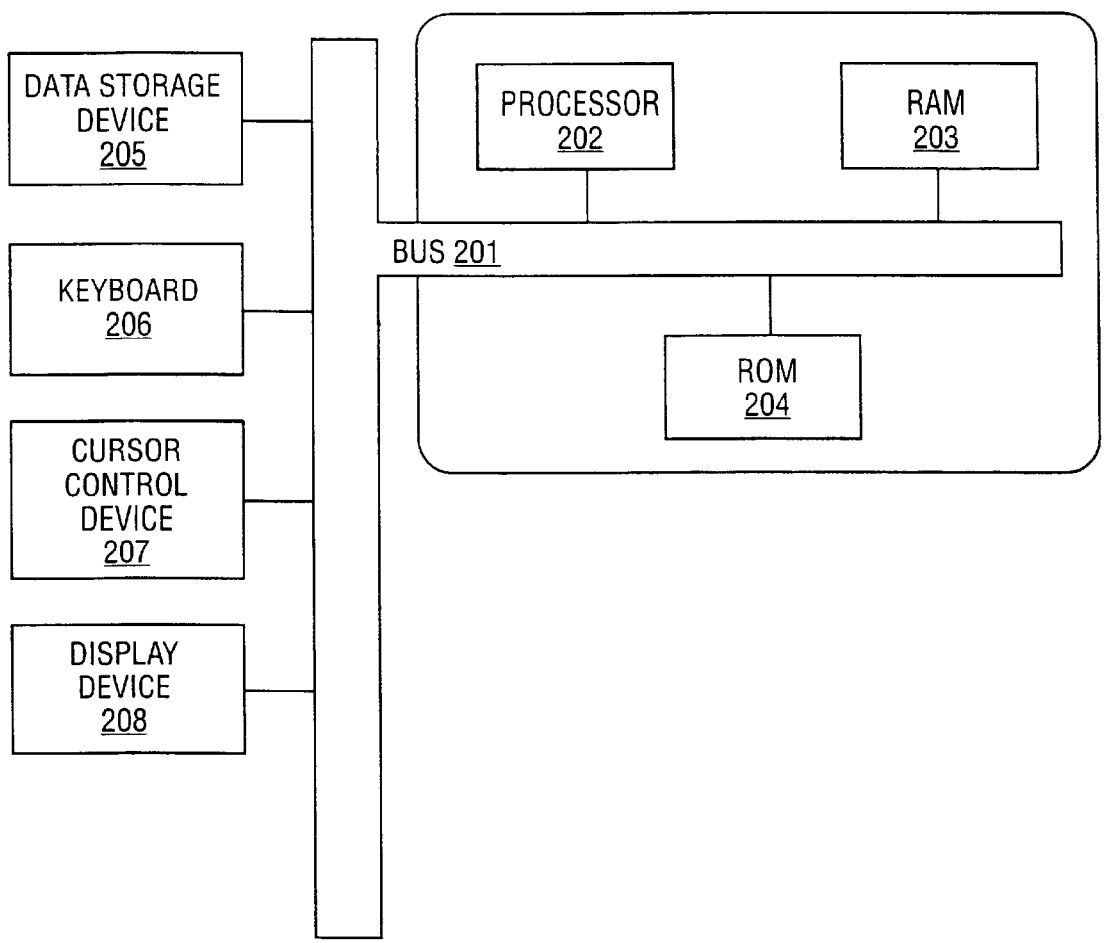
FIG. 2a illustrates a computer system as may be utilized by the currently preferred embodiment of the present invention.

The computer system of the preferred embodiment is described with reference to FIG. 2a. The present invention may be implemented on a general purpose microcomputer, such as one of the members of the IBM compatible Personal Computer family, or one of several work-station or graphics computer devices which are presently commercially available. A computer system as may be utilized by the preferred embodiment generally comprises a bus or other communication means 201 for communicating information, a processor means 202 coupled with said bus 201 for processing information, a random access memory (RAM) or other storage device 203 (commonly referred to as a main memory) coupled with said bus 201 for storing information and instructions for said processor 202, a read only memory (ROM) or other static storage device 204 coupled with said bus 201 for storing static information and instructions for said processor 202, a data storage device 205, such as a magnetic disk and disk drive, coupled with said bus 201 for storing information, instructions and task data, an alphanumeric input device 206 including alphanumeric and other keys coupled to said bus 201 for communicating information and command selections to said processor 202, a cursor control device 207, such as a mouse, track-ball, cursor control keys, etc. coupled to said bus 201 for communicating information and command selections to said processor 202 and for controlling cursor movement and a display device 208 coupled to said bus 201 for providing visual information to a user.

The currently preferred embodiment of the present invention is implemented on a computer system capable of supporting multi-tasking and which utilizes a paging unit, or it's equivalent, for performing address translations. A multi-tasking system allows for a plurality of tasks to be in an execution state. The computer system would allocate processor time slices for each of the tasks. This provides an appearance of the multiple tasks being executed concurrently. Specifically, a paging unit would include a cache structure, commonly referred to as a Translation Lookaside Buffer (TLB), to facilitate address translations from a provided linear address to a physical address.

Figure 2B:
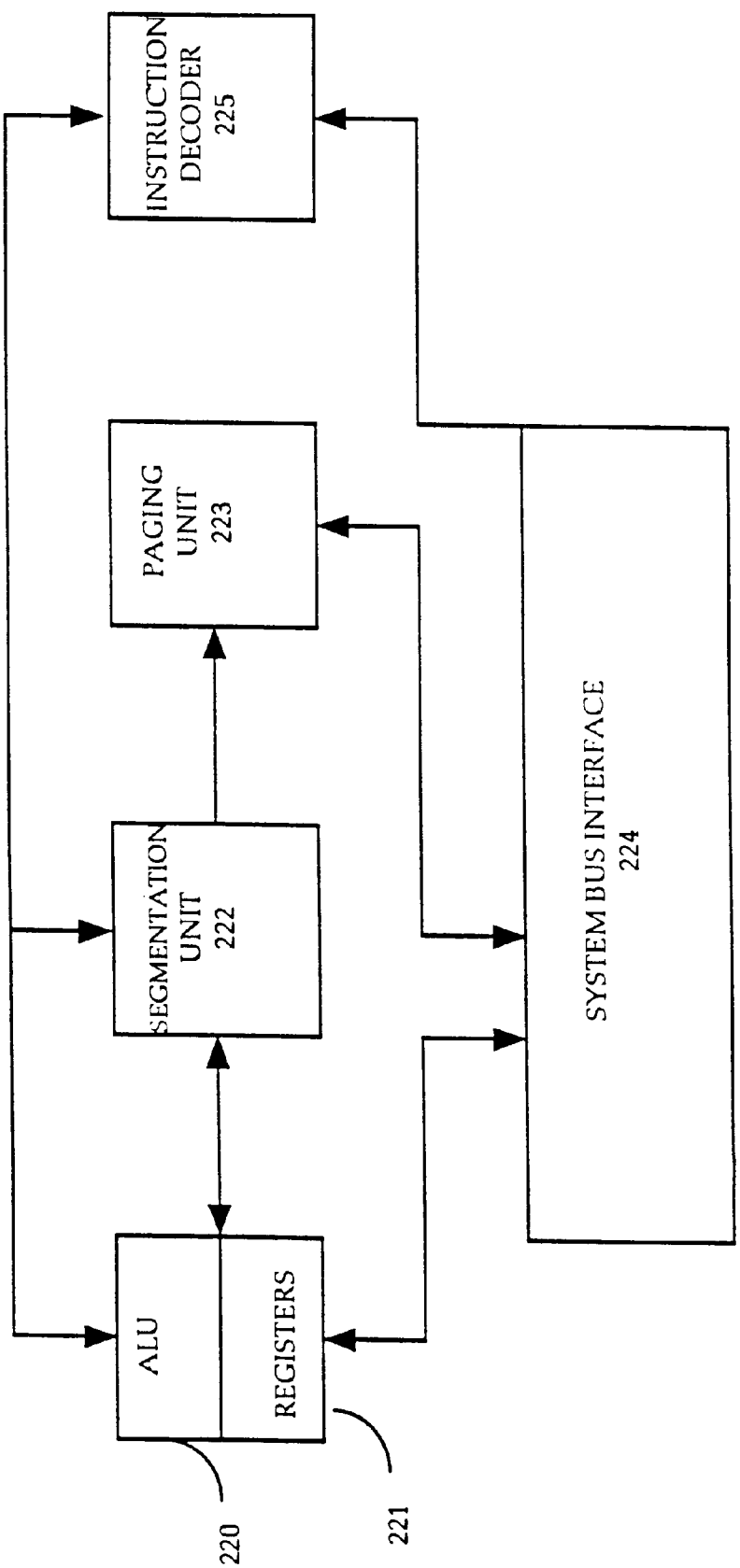
FIG. 2b is a simplified block diagram of a processor architecture having a paging unit as may be embodied by the currently preferred embodiment of the present invention.

FIG. 2b is a simplified block diagram of a processor architecture with a paging unit as utilized by the currently preferred embodiment of the present invention. The architecture includes an ALU 220 for performing arithmetic computations, registers 221 for storing information and control data and instruction decode module 225 for decoding instructions. In order to load data into a system memory, segmentation unit 222 and paging unit 223 perform address translations to identify a physical address in storage. The TLB arrangement is preferably embodied in the paging unit 223. The components are all coupled to system bus interface 224. The system bus interface 224 provides for coupling to, a bus structure for example, Bus 201 of FIG. 2a.

As would be apparent to one skilled in the art, the processor architecture of FIG. 2b may be implemented as discrete components, or as a single integrated circuit, e.g a microprocessor device. Accordingly, the present invention may be practiced on either a discrete computer system, or incorporated into a microprocessor device.

Translation Lookaside Buffer Arrangement Of The Currently Preferred Embodiment The present invention is practiced in systems which support paging A Translation Lookaside Buffer (TLB) is a cache of frequently accessed page table entries. Each page table entry contains a physical address to a page in memory. The purpose of the TLB is to increase the speed by which an address translation occurs.

Generally, paging is a memory management technique where programs and addressable memory are divided into uniform sizes, e.& a page. A second memory management technique is termed segmentation. Segmentation is used to group regions of memory which have common attributes. Segmentation is used as a basis for memory protection schemes. For example, all of the code of a given program could be contained in a segment This segment could then be protected to prevent unwanted modification of instructions.

Figure 3A:
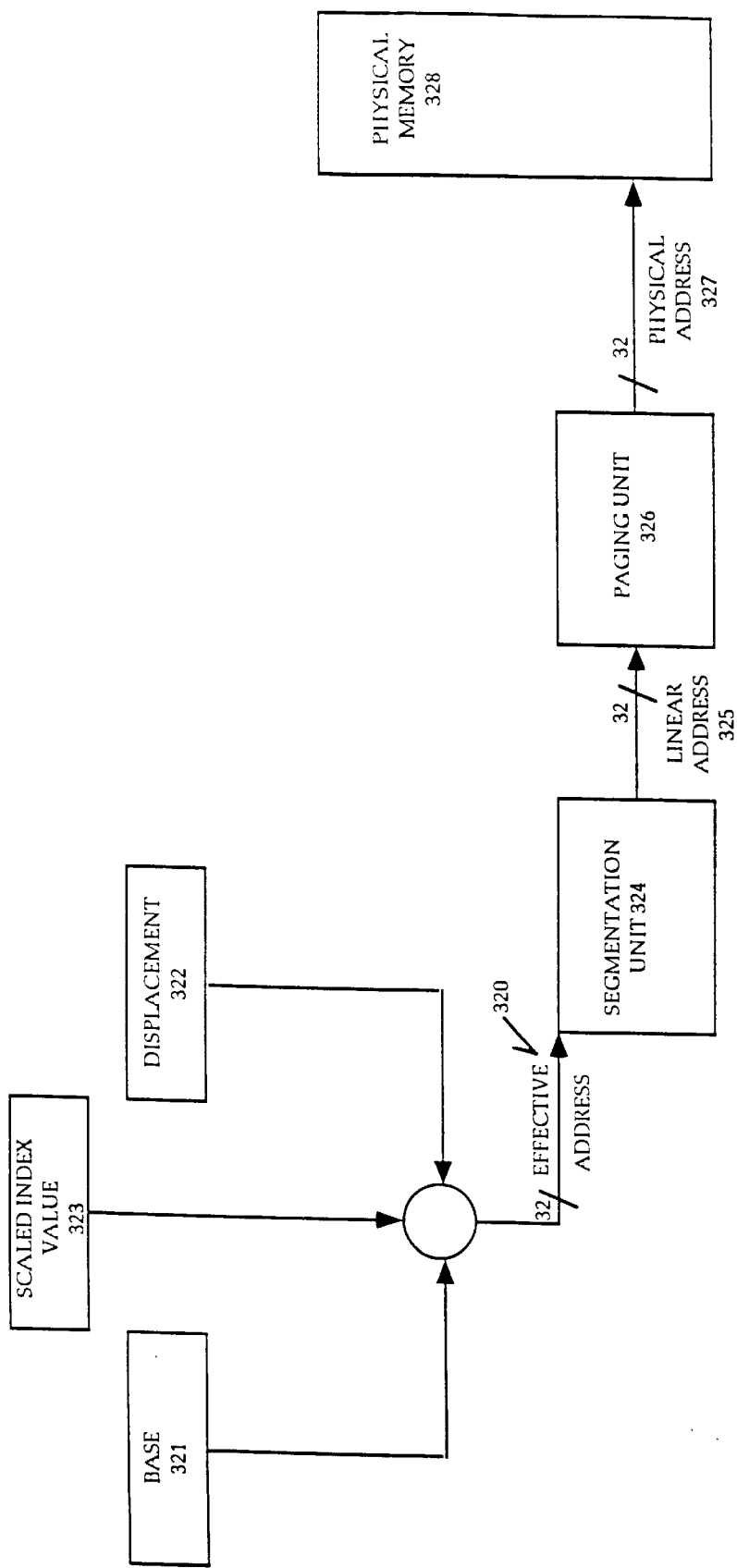
FIG. 3a is a block diagram illustrating the address translation scheme of the currently preferred embodiment of the present invention.

The address translation scheme of the currently preferred embodiment incorporates segmentation and paging aspects. This scheme is utilized in the Intel486 family of products and is illustrated in FIG. 3a. Referring to FIG. 3a, an effective address 320 is derived from the contents and format of an instruction. The components of an effective address are a base address 321 plus a displacement value 322 plus in some instances a scaled index value 323. The effective address is then provided to a segmentation unit 324. The segmentation unit adds a segment component to the effective address 320 to create a linear address 325. The linear address 325 is then translated into a physical address 327 by a paging unit 326. The physical address 327 is then used to access physical memory 328.

The paging unit 326 translates the linear address 325 through a series of table look-ups using various portions of the linear address 325. A first portion is used to access an entry in a page directory (not illustrated). The entries in a page directories are base indices into a page table (not illustrated). A second portion of the linear address is then added to the obtained page directory entry to create an index into a page table. The entry in the page table contains the desired physical address. Each page directory and page table has a direct relationship to the task being executed.

The use of a Translation Lookaside Buffer (TLB) avoids the Table Look-ups. The TLB is a cache of frequently accessed page table entries. By avoiding table Look-ups, processing time is saved.

A complication in the operation of the TLB cache is the switching of tasks. The present invention is used in systems that have multi-tasking capability. By multi-tasking capability it is meant that the application can concurrently execute multiple tasks according to some time sharing scheme. The complication introduced is that the page directory and page table are unique to a particular program, i.e. a task Thus, whenever a new task is scheduled for execution, new page directory and table entries must be loaded. Further, the Translation Lookaside Buffer must be flushed so as to avoid generating incorrect physical addresses.

In the present invention, the process for preparing a paging unit for executing a different task the TLB is loaded with the page table entries from the last time the task was executed. This has the advantage of not requiring the dynamic reloading of the TLB or the flushing of the TLB.

Figure 3B:
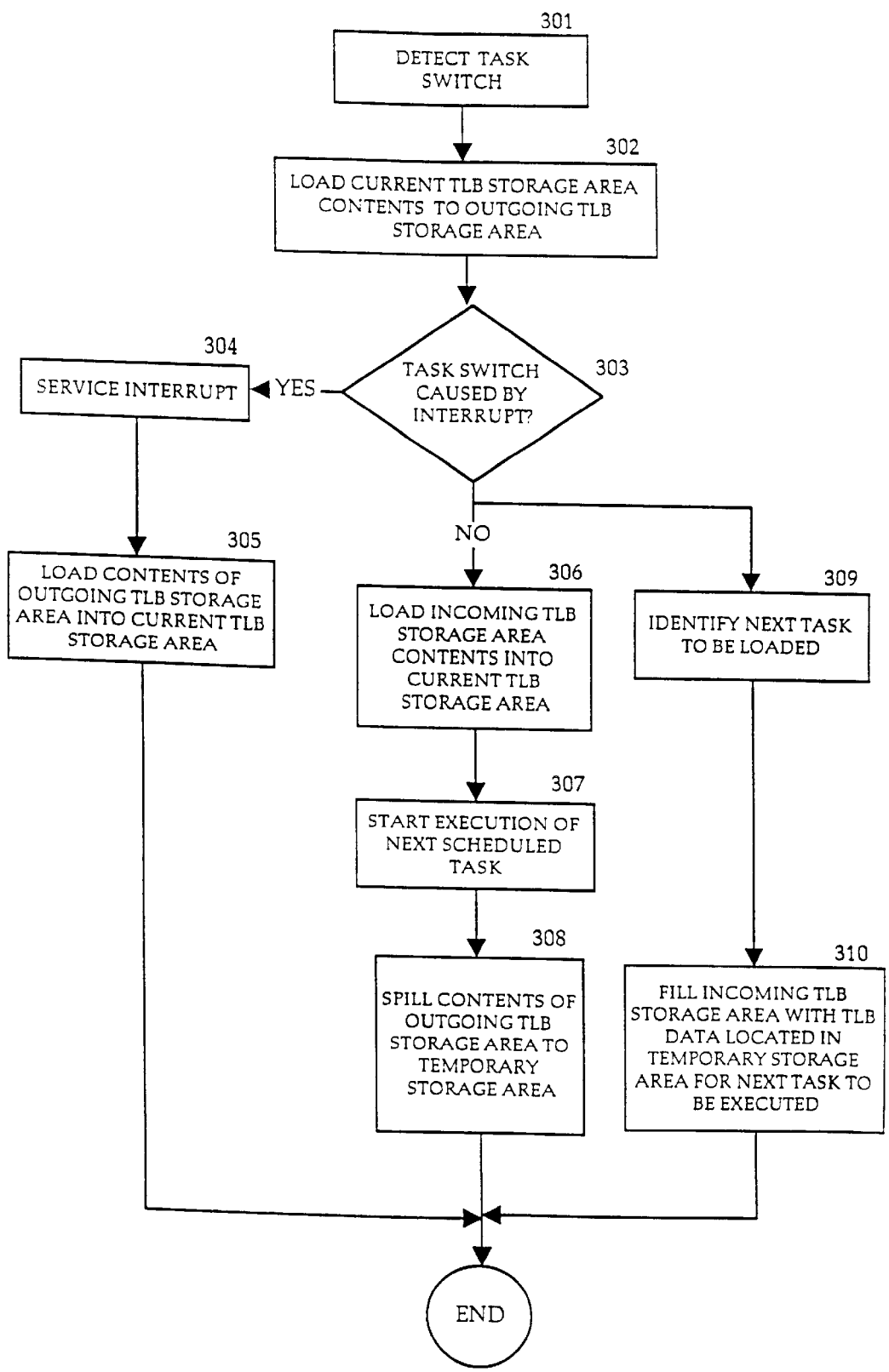
FIG. 3b is a flow chart illustrating the steps taken for management of the contents of a Translation Lookaside Buffer during a task switch as may be performed in the currently preferred embodiment of the present invention.

FIG. 3b is a flow chart illustrating the steps taken for reloading the TLB with entries from the last time the task was executed in response to a task switch. First, a task switch is detected, step 301. Detection of a task switch within the paging unit is via signals sent to a TLB controller. The TLB controller will be described in greater detail below. A task switch may be generated as a result of a program interrupt or by the current task exhausting it's allotted processing time. In any event, once a task switch is detected, the current TLB contents are loaded into an outgoing TLB storage area, step 302. This has the effect of saving the contents of the TLB for the outgoing task The current, incoming and outgoing TLB storage areas are preferably sets of registers having identical structures. A check is then made to determine if an interrupt caused the program switch, step 303. An interrupt is not a scheduled task so special handling is performed. Assuming an interrupt is the reason for the task switch, the interrupt is serviced, step 304. Servicing an interrupt is a term of art which refers to an interrupt handler, which may be part of the computer operating system, responding to and correcting for the conditions which caused the interrupt to occur. Once the interrupt is serviced, the contents of the outgoing TLB storage area are loaded back into the current TLB storage area, step 305.

In the currently preferred embodiment, the originally executing task is restored after the interrupt is serviced. Once this is completed, the task resumes execution until the next task switch. Other embodiments may completely swap out the task and the next scheduled task is executed. Such other embodiments would of course not perform the step 305 described above. Such embodiments would not depart from the spirit and scope of the present invention.

If the task switch is not caused by an interrupt, two sequences of events may then occur concurrently. First, the contents of an incoming TLB storage area is loaded into the current TLB area, step 306. At this point, the current TLB contains TLB entries for the task that is scheduled to be executed. The execution of the next scheduled task may now begin, step 307. The contents of the outgoing TLB register may then be spilled to temporary storage, step 308. By spilling it is meant that spare memory cycles, are used to make this transfer. Note, that the temporary storage may be associated with the task by adding the task ID to the stored TLB contents.

Concurrently with steps 306–308, the next scheduled task is identified, step 309. Identification of the next scheduled task depends on the task scheduling technique used. Generally, it can be accomplished by querying the task runlist managed by the scheduler. The incoming TLB storage area is filled with the TLB data for the next scheduled task step 310. By filling it is meant that spare memory cycles are utilized to perform the transfer of data from the temporary storage to the incoming TLB registers.

Spare memory cycles is a term of art that refers to periods of time that are unused for task execution. For example, spare memory cycles occur when the processor has no reads pending from memory, nor are there any writes queued to memory. Note that the temporary storage may be a portion of the computer system's main memory, a cache structure, external storage or even additional provided memory. The choice of how to embody the temporary storage is one that would depend on available system resource, time given for task switch, desired cost of the system and other such variables.

The present invention may also take other embodiments. For example, the spill and fill of incoming and outgoing Translation Lookaside Buffer (TLBs) storage areas may not need to occur to an external memory. It would be apparent to one skilled in the art that the outgoing TLB may be transferred out in conjunction with the structure used for storing task information (e.g.a Task State Segment or TSS). Further, when the task is scheduled to be executed, the TLB from the TSS could be inserted into the TLB.

Figure 4:
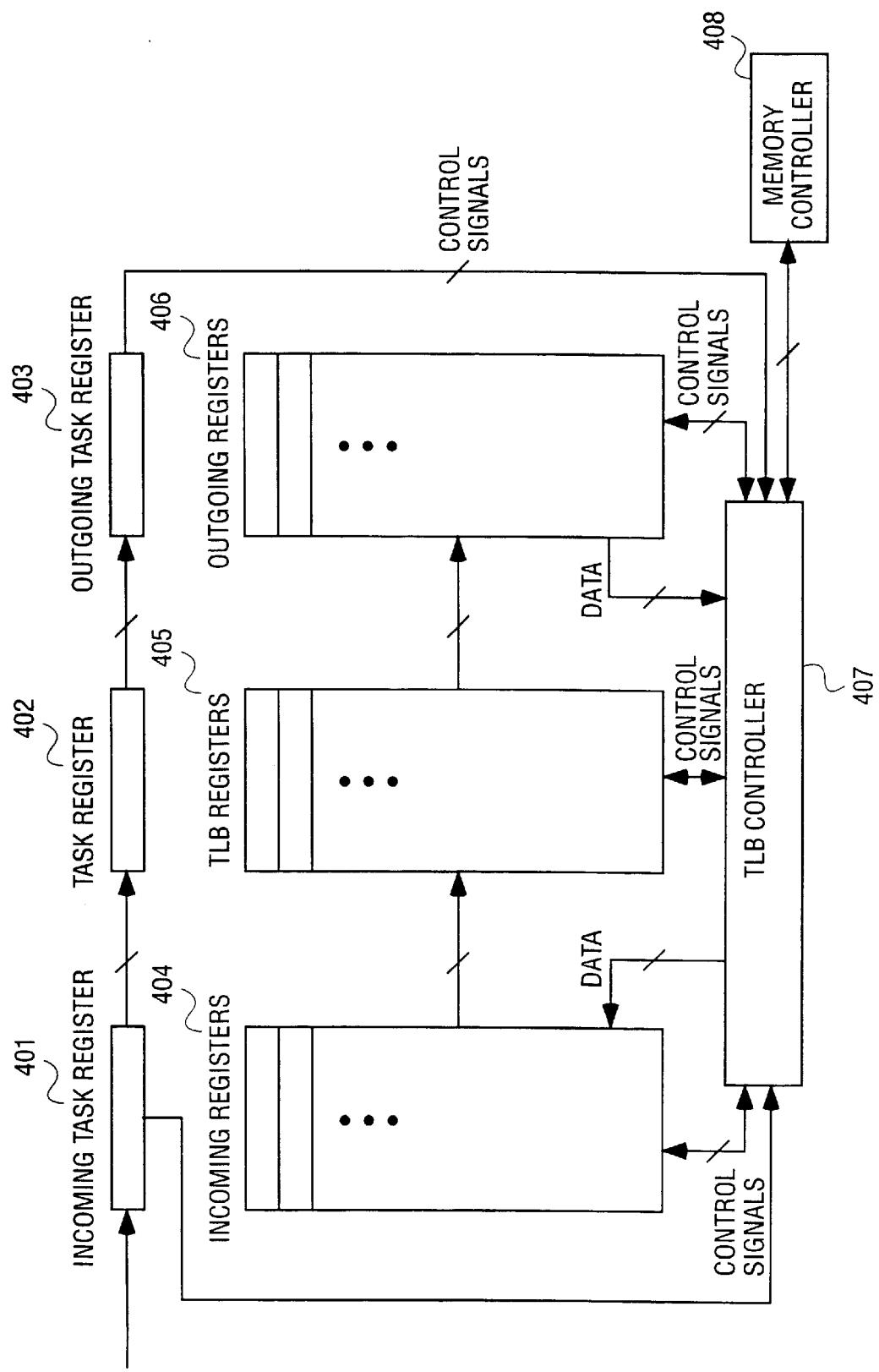
FIG. 4 is a block diagram of Translation Lookaside Buffer arrangement as may be utilized in the currently preferred embodiment of the present invention.

FIG. 4 is a block diagram of the TLB arrangement of the currently preferred embodiment of the present invention. The TLB arrangement is controlled by the TLB controller 407. The TLB controller manages not only the transfer of the TLB data between the incoming registers 404, TLB registers 405 and outgoing registers 406, but it also controls the scanning of the TLB registers 405 looking for matches. In the currently preferred embodiment, the TLB controller 407 may be a logic device such as a Programmable Logic Array (PLA) or a gate array. The TLB controller 407 is coupled to incoming task register 401 and outgoing register 403. Note that coupled between incoming task 401 and outgoing task register 403 is task register 402. The task register 402 contains the task information for the currently executing task Note that the data from task register 402 will propagate to outgoing task register 403 and the data from incoming task register 401 will propagate to task register 402 as the task switch occurs. As described above, the incoming task register receives its information identifying the incoming task from the scheduler. In any event, the incoming task register is coupled to the TLB controller and is used to identify the data in memory from which the incoming task registers 404 will be filled. In a similar manner, the outgoing task register 403 is coupled to the TLB controller 407 for identifying the outgoing TLB information with the outgoing task The TLB controller 407 is also used to determine whether a fill to the incoming task storage area or a spill to memory will occur. The TLB controller 407 will allocate spare memory cycles between a fill and spill operations according to the page unit operating scheme. For example, the fill of the incoming task storage area from memory may be performed before any spill of the outgoing task storage area to memory. It would be apparent to one skilled in the art to use any such scheme to accomplish the spills and fills. Finally, the memory controller 408 is used to access the system memory for fill and spin operations.

The present invention may also take on other embodiments. As the currently preferred embodiment was designed for use in computer system with processor architectures like the Intel486DX certain variations on the implementations may be required on support of other architectures. Such variations would not depart from the spirit and scope of the present invention.

TLB Controller Operation

Figure 5:
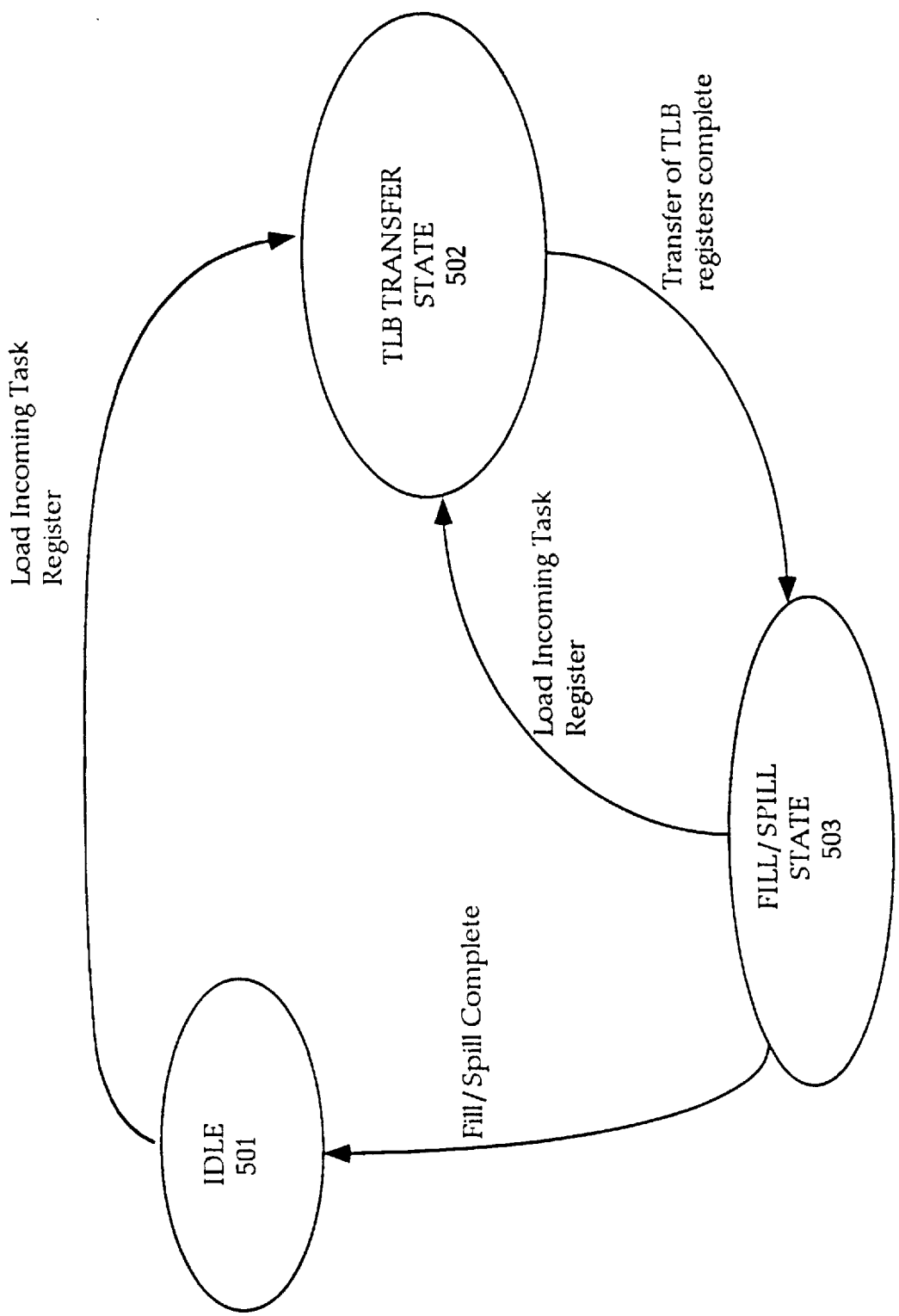
FIG. 5 is a state diagram of a Translation Lookaside Buffer controller as may be utilized in the currently preferred embodiment of the present invention.

FIG. 5 is a state diagram showing the operation of TLB controller 407 of FIG. 4 with respect to the TLB management of the present invention. The TLB controller starts in an idle state 501. When in this idle state, no data is being transferred. Upon initiation of a task switch the TLB controller enters a TLB transfer state 502 where the contents of the current TLB is transferred to the outgoing TLB and the incoming TLB is transferred to the current TLB. When the transfer of the TLB registers is complete the fill/spill state 503 is entered. During the fill/spill state the outgoing TLB data is spilled to external storage and the incoming TLB is filled from external storage. As described above, this occurs when spare memory cycles are available. During this state if another task switch occurs, the TLB transfer state is entered. When this fill/spill is completed TLB controller returns to the idle state 501.

The currently preferred embodiment of the present invention would have particular application in systems with relatively small task-switch quanta, or systems which need predictable task switch times. However, the present invention may be practiced on systems with different operating characteristics.

Thus, a method and apparatus for optimizing use of Translation Lookaside Buffers, is disclosed.

We claim:

1. An improved paging means in a computer system capable of executing multiple tasks concurrently, said computer system having: a task storage means for storing task data; a means for generating a linear address from a task instruction; and an improved paging means for translating a linear address to a physical address, said improved paging means comprising:

a translation lookaside buffer (TLB);

means for indenting a next scheduled task;

first storage means coupled to said TLB for storing outgoing TLB data corresponding to an outgoing task;

second storage means coupled to said TLB for storing incoming TLB data corresponding to the next scheduled task; and transfer means coupled between said first and second storage means and the TLB for transferring the contents of said TLB to said first storage means and the contents of said second storage means to said TLB responsive to a task switch.

2. The improved paging means of claim 1 wherein said paging means is further comprised of:
   a) means for detecting unused memory cycles on said computer system;
   b) a TLB holding area for storing TLB data for tasks not currently being executed;
   c) spill means for transferring the contents of said first storage means to said TLB holding area, said spill means responsive to detection of unused memory cycles such that said transfer occurs during spare memory cycles;
   d) fill means for transferring a portion of said TLB holding area containing TLB data for said next scheduled task to said second storage means, said fill means responsive to detection of unused memory cycle; and
   e) means for allocating unused memory cycles between said spill means and said fill means.

3. A paging unit for performing linear address to physical address translations in a computer system, said paging unit comprised of:
   (a) a first storage area for storing a plurality of page table entries, each of said page table entries containing a physical address to a page in task storage;
   (b) a second storage area for storing a subset of said page table entries in said first storage area;
   (c) means for comparing a linear address to the contents of said second storage area and if said linear address is in said second storage area, providing said page table entry as a physical address;
   (d) control means for pre-loading said second storage area with page table entries corresponding to a task, said page table entries saved from a prior execution of said task, the control means including:
      means for identifying a next scheduled task,
      incoming task storage for storing page table entries for the next scheduled task,
      outgoing task storage for storing page table entries for a task to be replaced,
      means for detecting a task switch,
      means for transferring the contents of said second storage area to said outgoing task storage responsive to said task switch,
      means for transferring the contents of said incoming task storage to said second storage area,
      spill means for transferring the contents of said outgoing task storage to a temporary storage area, and
      fill means for transferring a portion of said temporary storage associated with a next scheduled task to said incoming task storage; and
   (e) means for identifying an entry in said first storage area from said linear address.

4. The paging unit as described in claim 3 wherein said control means is further comprised of:
   a) means for detecting unused memory cycles; and
   b) means for allocating unused memory cycles between said spill means and said fill means.

5. A method of operation for a paging unit comprising:
   a) receiving a linear address;
   b) determining if said linear address is contained in a first storage area of recently used page table entries associated with an executing task, each of said page table entries containing a physical address;
   c) if said linear address matches an entry in said first storage area, providing a physical address;
   d) if said linear address is not in said first storage area, obtaining a physical address through table look-ups in a page directory and page table;
   e) detecting a task switch to a next scheduled task, the next scheduled task not being an interrupt handler;
   f) updating said page directory and page table with data associated with an upcoming task;
   g) moving the contents of said first storage area to an outgoing task storage; and
   h) moving the contents of an incoming task storage to said first storage area, said incoming task storage contains page table entries for said incoming task.

6. The method as recited in claim 5 is further comprised of:
   a) detecting the availability of memory cycles;
   b) transferring the contents of said outgoing task storage to an external storage medium when memory cycles are available;
   c) marking said transferred contents as being associated with said outgoing task; and
   d) transferring page table entries associated with said next scheduled task to said incoming task storage from said external storage medium.

7. In a computer system having a paging unit for translating a linear address to a physical address, said paging unit having a page table and page table cache, a method for updating said page table and said page table cache responsive to a task switch, comprising:
   a) identifying a next scheduled task;
   b) loading said page table with page table entries corresponding to said next scheduled task; and
   c) loading said page table cache with entries saved from the page table cache during a prior execution of said next scheduled task.

8. The method as recited in claim 7 wherein the step of loading said page table cache with entries from a prior execution of said next scheduled task is further comprised of the steps of:
   a) transferring the contents of said page table cache to a storage area for storing page table entries of active and non-executing tasks; and
   b) transferring the contents of an incoming task storage to said page table cache, said incoming task storage having page table entries for said next scheduled task.

9. The method as recited in claim 8 wherein said step of transferring the contents of said page table cache to a storage area for storing page table entries of active and non-executing task is further comprised of the steps of
   a) transferring the contents of said page table cache to an outgoing task storage; and
   b) transferring the contents of said outgoing task storage to said storage area during spare memory cycles.

10. The method as recited in claim 9 wherein said incoming task storage is loaded from said storage area during spare memory cycles.

\* \* \* \* \*